US008839173B1

(12) United States Patent
Jiang et al.

(10) Patent No.: US 8,839,173 B1
(45) Date of Patent: Sep. 16, 2014

(54) ENGINEERING CHANGE ORDER HOLD TIME FIXING METHOD

(71) Applicant: National Chiao Tung University, Hsinchu (TW)

(72) Inventors: Hiu-Ru Jiang, New Taipei (TW); Yu-Ming Yang, New Taipei (TW); Sung-Ting Ho, Taoyuan County (TW)

(73) Assignee: National Chiao Tung University, Hsinchu (TW)

(*) Notice: Subject to any disclaimer, the term of this patent is extended or adjusted under 35 U.S.C. 154(b) by 0 days.

(21) Appl. No.: 13/931,589

(22) Filed: Jun. 28, 2013

(30) Foreign Application Priority Data

Mar. 5, 2013 (TW) .............................. 102107593 A

(51) Int. Cl.
G06F 17/50 (2006.01)

(52) U.S. Cl.
CPC .................................. *G06F 17/5031* (2013.01)
USPC ........... 716/114; 716/111; 716/112; 716/113; 716/139

(58) Field of Classification Search
CPC ............ G06F 17/5031; G06F 2217/84; G06F 2217/72
USPC ......................................... 716/111–114, 139
See application file for complete search history.

(56) References Cited

U.S. PATENT DOCUMENTS

| | | | |
|---|---|---|---|
| 6,990,646 B2 | 1/2006 | Yoshikawa | |
| 7,191,416 B2* | 3/2007 | Hulbert et al. | 716/114 |
| 7,278,126 B2* | 10/2007 | Sun et al. | 716/114 |
| 7,325,211 B1* | 1/2008 | Bistry | 716/108 |
| 7,331,028 B2* | 2/2008 | Dinter et al. | 716/113 |
| 7,634,743 B1* | 12/2009 | Ginetti | 716/103 |
| 2009/0007041 A1* | 1/2009 | Miyagawa | 716/6 |
| 2010/0050142 A1* | 2/2010 | Dirks et al. | 716/6 |
| 2012/0066654 A1* | 3/2012 | Hopkins et al. | 716/102 |
| 2013/0346931 A1* | 12/2013 | Murakawa | 716/108 |

OTHER PUBLICATIONS

"Timing ECO Optimization via Bezier Curve Smoothing and Fix-ability Identificaition", by Hua-Yu Chang, Iris Hui-Ru Jiang, and Yao-Wen Chang, @2011 IEEE.*
J.P. Fishburn, "Clock Skew Optimization," IEEE Transactions on Computers, vol. 39, No. 7, Jul. 1990, pp. 945-951.
N. V. Shenoy et al., "Minimum Padding to Satisfy Short Path Constraints," Computer-Aided Design, IEEE, 1993, pp. 156-161.
R.B. Deokar et al., "A Graph-theoretic Approach to Clock Skew Optimization," Circuits and Systems, IEEE, 1994, pp. 407-410.
Y.P. Chen et al., "ECO Timing Optimization Using Spare Cells," Computer-Aided Design, IEEE, 2007, pp. 530-535.
S.H. Huang et al., "Clock Period Minimization with Minimum Delay Insertion," ACM, USA, 2007, pp. 970-975.

(Continued)

*Primary Examiner* — Nha Nguyen
(74) *Attorney, Agent, or Firm* — Muncy, Geissler, Olds & Lowe, P.C.

(57) ABSTRACT

An ECO hold time fixing method fulfills a short path padding in a placed and routed design by a minimum capacitance insertion. In the method, a padding value determination step receives the placed and routed design and is based on a cell library, timing constraints, and a timing analysis report to determine padding values and locations required for each gate of the placed and routed design to output. A load/buffer allocation step is based on a spare cell information, a dummy metal information, and the padding values and locations to achieve the short path padding in the placed and routed design.

9 Claims, 15 Drawing Sheets

(56) References Cited

OTHER PUBLICATIONS

C. Lin et al., "Clock Skew Scheduling with Delay Padding for Prescribed Skew Domains," Asia and South Pacific Design Automation Conference, 2007, pp. 541-546.

Y. Liu et al., "Re-Synthesis for Cost-Efficient Circuit-Level Timing Speculation," ACM, USA, 2011, pp. 158-163.

Y.M. Yang et al., "PushPull: Short Path Padding for Timing Error Resilient Circuits," ACM, USA, 2013, pp. 50-57.

* cited by examiner

| Spare cells | Padding value | | | | | |
|---|---|---|---|---|---|---|
| | 0.00 | 0.05 | 0.10 | 0.15 | 0.20 | 0.25 |
| ∅ | 0.00 ∅ | 0.00 ∅ | 0.00 ∅ | 0.00 ∅ | 0.00 ∅ | 0.00 ∅ |
| {$s_1$} | 0.00 ∅ | 0.00 ∅ | 0.00 ∅ | 0.00 ∅ | 0.20 {$s_1$} | 0.20 {$s_1$} |
| {$s_1$, $s_2$} | 0.00 ∅ | 0.00 ∅ | 0.00 ∅ | 0.15 {$s_2$} | 0.20 {$s_1$} | 0.20 {$s_1$} |
| {$s_1$, $s_2$, $s_3$} | 0.00 ∅ | 0.00 ∅ | 0.10 {$s_3$} | 0.15 {$s_2$} | 0.20 {$s_1$} | 0.25 {$s_2$, $s_3$} |

FIG. 8

| Circuit | #Gate | #FF | #SFF | Conservative clock period (ns) | THS (ps) |
|---|---|---|---|---|---|
| s1196 | 301 | 19 | 1 | 1.0 | 152.5 |
| s1423 | 486 | 74 | 45 | 1.0 | 4,916.9 |
| s5378 | 739 | 162 | 37 | 1.0 | 3,852.8 |
| s9234 | 555 | 132 | 24 | 1.0 | 1,929.0 |
| s13207 | 748 | 213 | 14 | 1.0 | 371.2 |
| s15850 | 428 | 128 | 29 | 1.0 | 2,114.6 |
| s38584 | 7,890 | 1,159 | 194 | 3.4 | 108,759.0 |
| des_perf | 51,349 | 8,808 | 1,190 | 2.9 | 583,579.0 |
| b19 | 72,872 | 5,541 | 2,737 | 3.8 | 1,481,800.0 |

FIG. 13

| Circuit | LP | | | | | Greedy 1: Largest setup first [12] | | | |
|---|---|---|---|---|---|---|---|---|---|
| | TNS₁ (ps) | THS₁ (ps) | Padding delay (ps) | Runtime (s) | TNS₁ (ps) | THS₁ (ps) | Padding delay (ps) | #Ite. | Runtime (s) |
| s1196 | 0.0 | 0.0 | 152.5 | 0.03 | 0.0 | 0.0 | 338.4 | 5 | 0.02 |
| s1423 | 0.0 | 0.0 | 4,126.8 | 0.15 | 0.0 | 43.5 | 4,968.7 | 56 | 0.45 |
| s5378 | 0.0 | 0.0 | 3,661.3 | 0.06 | 0.0 | 79.3 | 4,678.1 | 60 | 0.79 |
| s9234 | 0.0 | 0.0 | 1,459.6 | 0.05 | 0.0 | 12.0 | 1,878.3 | 33 | 0.30 |
| s13207 | 0.0 | 0.0 | 371.2 | 0.03 | 0.0 | 34.5 | 762.3 | 22 | 0.21 |
| s15850 | 0.0 | 0.0 | 1,305.1 | 0.03 | 0.0 | 0.0 | 1,662.8 | 43 | 0.25 |
| s38584 | 0.0 | 0.0 | 108,476.0 | 6.96 | 0.0 | 0.0 | 225,026.0 | 780 | 115.19 |
| des_perf | 0.0 | 0.0 | 583,579.0 | 60.59 | 0.0 | 19,270.5 | 795,022.0 | 3,414 | 6,401.86 |
| b19 | NA | NA | NA | timeout | 0.0 | 108,078.0 | 6,128,710.0 | 21,902 | 37,473.30 |

FIG. 14A

| Circuit | Greedy 2: Most path sharing first [11][12][13] | | | | | Invention: PushPull | | | | |
|---|---|---|---|---|---|---|---|---|---|---|
| | TNS₁ (ps) | THS₁ (ps) | Padding delay (ps) | #Ite. | Runtime (s) | TNS₁ (ps) | THS₁ (ps) | Padding delay (ps) | #Ite. | Runtime (s) |
| s1196 | 0.0 | 0.0 | 173.8 | 3 | 0.01 | 0.0 | 0.0 | 152.5 | 1 | 0.02 |
| s1423 | 0.0 | 43.5 | 4,802.8 | 35 | 0.24 | 0.0 | 0.0 | 4,746.9 | 2 | 0.05 |
| s5378 | 0.0 | 79.3 | 4,555.4 | 43 | 0.58 | 0.0 | 0.0 | 3,722.7 | 2 | 0.08 |
| s9234 | 0.0 | 12.0 | 2,158.5 | 27 | 0.26 | 0.0 | 0.0 | 1,647.5 | 1 | 0.05 |
| s13207 | 0.0 | 34.5 | 621.5 | 18 | 0.21 | 0.0 | 0.0 | 371.2 | 2 | 0.07 |
| s15850 | 0.0 | 0.0 | 2,161.5 | 41 | 0.27 | 0.0 | 0.0 | 1,510.8 | 2 | 0.04 |
| s38584 | 0.0 | 85.8 | 130,703.0 | 512 | 80.37 | 0.0 | 0.0 | 143,764.1 | 2 | 1.04 |
| des_perf | 0.0 | 3,864.1 | 595,088.0 | 2,257 | 4,202.46 | 0.0 | 0.0 | 583,579.0 | 2 | 9.46 |
| b19 | 0.0 | 65,746.7 | 1,729,230.0 | 6,220 | 10,978.40 | 0.0 | 0.0 | 1,675,688.0 | 4 | 21.68 |

FIG. 14B

| Circuit | LP+Mapping [6] | | | Invention: PushPull | | |
|---|---|---|---|---|---|---|
| | $TNS_2$ (ps) | $THS_2$ (ps) | Runtime (s) | $TNS_2$ (ps) | $THS_2$ (ps) | Runtime (s) |
| s1196 | 0.0 | 0.3 | 0.03 | 0.0 | 0.0 | 0.33 |
| s1423 | 0.0 | 826.4 | 0.09 | 0.0 | 0.0 | 0.43 |
| s5378 | 0.0 | 302.3 | 0.05 | 0.0 | 0.0 | 0.54 |
| s9234 | 0.0 | 631.3 | 0.04 | 0.0 | 0.0 | 0.41 |
| s13207 | 0.0 | 161.2 | 0.03 | 0.0 | 0.0 | 0.61 |
| s15850 | 0.0 | 352.0 | 0.02 | 0.0 | 0.0 | 0.38 |
| s38584 | 0.0 | 29,970.7 | 0.58 | 0.0 | 0.0 | 1.96 |
| des_perf | 0.0 | 51,146.0 | 41.99 | 0.0 | 0.0 | 12.36 |
| b19 | NA | NA | NA | 0.0 | 0.0 | 43.33 |

FIG. 15

ENGINEERING CHANGE ORDER HOLD TIME FIXING METHOD

BACKGROUND OF THE INVENTION

1. Field of the Invention

The present invention relates to the technical field of integrated circuits and, more particularly, to an engineering change order (ECO) hold time fixing method.

2. Description of Related Art

Due to a wide range of dynamic variations, e.g., supply voltage droops, process variations, temperature fluctuations, soft errors, and transistor aging degradation, the timing characterization is extremely difficult in modern IC designs. Therefore, in conventional design, designers conservatively reserve a timing guardband to ensure correct functionality even under the worst-case circumstance. However, this reserved guardband may severely degrade circuit performance, i.e., limit the clock frequency.

Accordingly, several resilient circuits have been proposed to eliminate the guardband by error detection and correction. For example, a Razor flip-flop (FF) is used as an error detection circuit (See D. Ernst et al., "Razor: a low-power pipeline based on circuit-level timing speculation" MICRO, pp.7-18, 2003). FIG. 1 illustrates a conventional Razor FF used as the error detection circuit. As shown in FIG. 1, the error detection circuit has an extra storage element, i.e., the shadow latch 110, to sample the output of a combinational logic 120 by a delayed clock clk_dly. The output of a main flip-flop 130 is compared with the output of the shadow latch by a comparator 140, i.e., an XNOR gate. When the comparison result indicates a detected timing error, a timing error signal is generated, and the error correction is performed through an instruction replay.

However, these resilient circuits require a significant hold time margin for short paths. Taking the circuit of FIG. 1 as an example, the resilient circuit may detect a false timing error if the result of the next computation is propagated through a short path and sampled by the delayed clock. To avoid such false error detection, the short paths have to exceed an error detection window w, i.e., the phase difference between the normal clock clk and the delayed clock clk_dly. The error detection window w causes an extra hold time margin requirement. This issue also exists in the resilient circuits proposed in other articles. Due to the extra hold time margin requirement, the short path padding or hold timing fixing in the resilient circuits becomes more challenging.

To resolve this padding problem, prior works typically insert buffers to lengthen the short paths.

Among the prior works, the delay padding is combined with a clock skew scheduling to minimize the clock period at the logic re-synthesis stage. The goal is to determine the padding path for each path rather than to decide where to insert the delay.

By contrast, another short path padding method determines the positions to insert the delay. This problem is solved by a linear programming proposed in N. V. Shenoy et al. "Minimum padding to satisfy short path constraints." ICCAD, pp.156-161, 1993. However, such linear programming is time-consuming and not applicable to large-scale circuits. Hence, another prior art provides greedy heuristics. One greedy rule is to pad the gate with the largest setup slack for trying not to hurt the longest path delay. The other is to pad at the gate passed by the most hold violating paths for trying to reduce the total padding delay.

FIG. 2 shows a flowchart of integrating timing error resilient circuits into a design. Because of considering the timing guardband, based on the logic synthesis and timing analysis of conservative clock period, the target clock period and the error detection window w are determined. Moreover, the invention proposes coarse-grained and fine-grained padding allocation methods to further achieve the derived padding values at physical implementation. $S_{th}/H_{th}$ represents a ratio of the target clock period over the conservative clock period. The timing suspicious flip-flops, whose longest path delays exceed the target clock period, can be replaced by the resilient circuits. Before the replacement, the design is re-synthesized where the suspicious flip-flops are assigned with an extra hold time margin to cover the error detection window w. After the replacement, a placement and routing is applied. Because of the significant hold time margin, the hold violations may still exist in a placed and routed design. Finally, the short path padding is performed.

In addition, it is found that the cited greedy heuristics cannot pad the short paths well. FIGS. 3A-3D show typical short path padding. FIG. 3A gives an input design, where gates $g_1$, $g_2$, $g_3$ incur hold violations. After iteratively padding delay on the gate either with the largest setup slack or with the most hold violating paths, the result is shown in FIG. 3B or 3C. From FIGS. 3B and 3C, it is found that the unresolved hold violation at gate $g_2$ exists. However, all the hold violations can be cleaned by the padding way shown in FIG. 3D. Accordingly, it is clear that the padding based only on local views cannot pad all the short paths. Moreover, even an optimal padding solution is found, it may still fail at a physical implementation because the delay offered by buffers is fixed. For example, if one buffer offers either a 0.15-unit or 0.25-unit delay, the padding task still fails on gate $g_2$.

Therefore, it is desirable to provide an improved hold timing fixing method to mitigate and/or obviate the aforementioned problems.

SUMMARY OF THE INVENTION

The object of the present invention is to provide an engineering change order (ECO) hold time fixing method, which determines the padding values and locations with a global view and uses spare cells in a coarse-grained delay padding and a dummy metal in a fine-grained delay padding, so as to successfully achieve the hold time fixing in a placed and routed design.

To achieve the object, the present invention provides an ECO hold time fixing method, which fulfills the short path padding in a placed and routed design by a minimum capacitance insertion. The method includes a padding value determination step and a load/buffer allocation step. The padding value determination step receives the placed and routed design and is based on a cell library, timing constraints, and a timing analysis report to determine padding values and locations required for each gate of the placed and routed design to output. The load/buffer allocation step is based on a spare cell information, a dummy metal information, and the padding values and locations to achieve the short path padding in the placed and routed design.

Other objects, advantages, and novel features of the invention will become more apparent from the following detailed description when taken in conjunction with the accompanying drawings.

BRIEF DESCRIPTION OF THE DRAWINGS

FIG. 8 is a table illustrating a relationship between spare cells and padding values when subset sums are solved by a dynamic programming according to the invention;

FIG. 13 is a table of benchmark statistics according to the invention;

FIGS. 14A and 14B are a comparison table of padding values of the invention and the prior art; and FIG. 15 is a comparison table of negative setup slack/ negative hold slack of the invention and the prior art.

DETAILED DESCRIPTION OF THE PREFERRED EMBODIMENT

Figure 4:
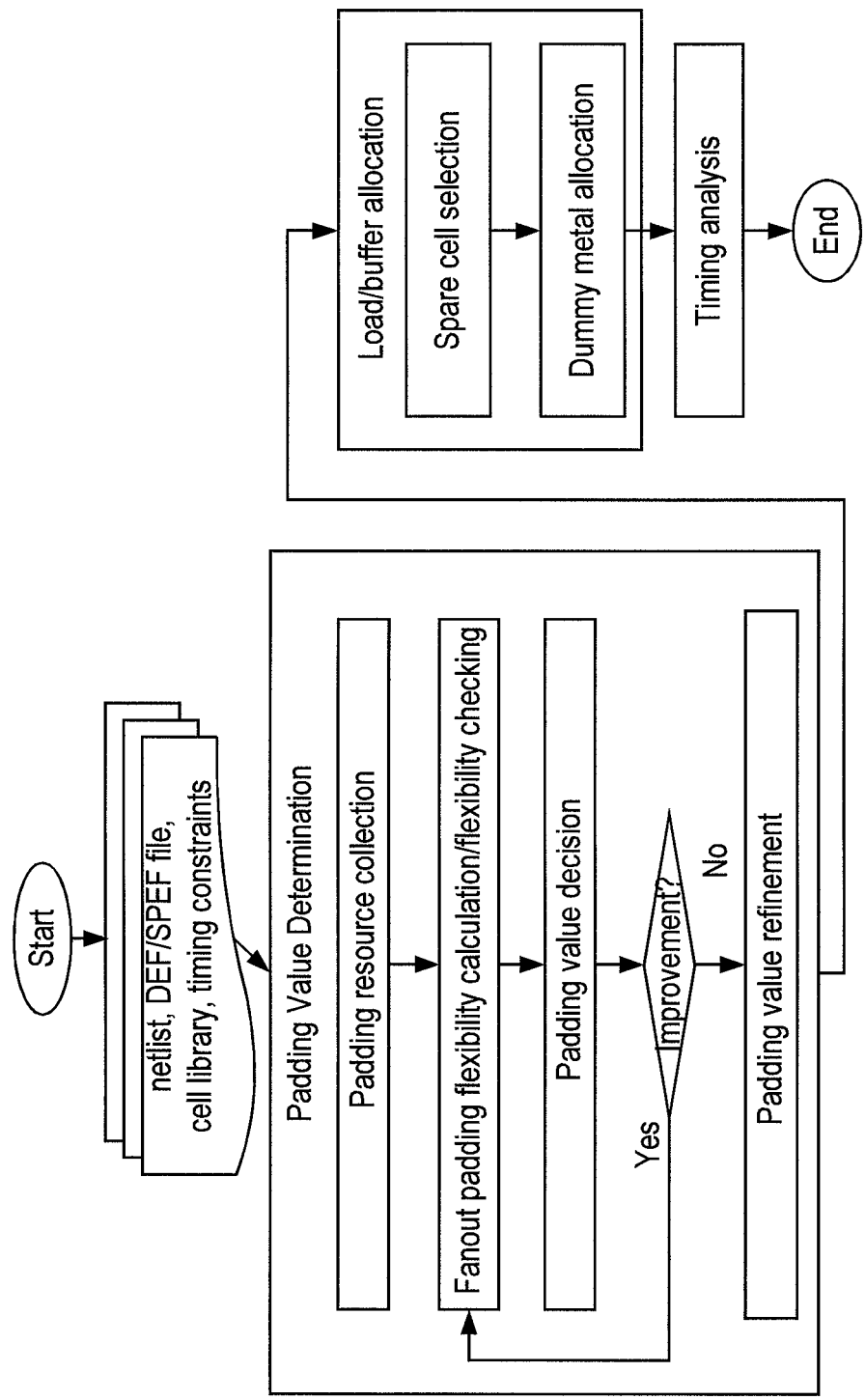
FIG. 4 is a flowchart of an ECO hold time fixing method according to the invention.

FIG. 4 is a flowchart of an engineering change order (ECO) hold time fixing method according to the invention. The method inserts the minimum capacitance in a placed and routed design to thereby fulfill the short path padding in the placed and routed design.

The cell timing model used in the invention is based on Synopsys' Liberty library. The calibrated delay values of each library cell are stored in lookup tables and indexed by its input slew and output capacitance. Thus, each gate delay can be obtained. The wire delay of each net is lumped into the delay of its driving gate. The output capacitance of a gate includes its wire loading, the input capacitance of its fanout gates, and its output pin capacitance. Proposed by Chen et al. "ECO timing optimization using spare cells", the ICCAD, pp. 530-535, 2007, it teaches a loading dominance phenomenon, i.e., the change on the gate delay is dominated by the change on the output loading, as compared with the change on the input slew. Thus, the invention increases the output capacitance of the gate to thereby increase the delay. Namely, the increased delay is converted into the capacitance. In addition, the output capacitance of the gate is not greater than the maximum load capacitance defined in the cell library.

The short path padding is not only important for the conventional IC designs but also more challenging in the resilient circuits. In order to validate the error detection and correction mechanism of the resilient circuits, the invention focuses on the short path padding problem which is formulated as follows: given a placed and routed design, the cell library, spare cells, dummy metal information, timing constraints, and a timing analysis report for inserting the minimum capacitance to pad all the short paths under the timing constraints.

Figure 5A:
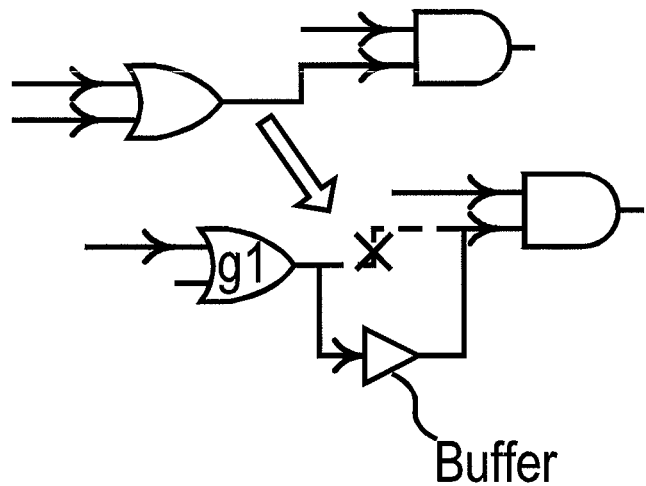
FIGS. 5A and 5B are schematic diagrams of delay padding of short paths according to the invention.
Figure 5B:
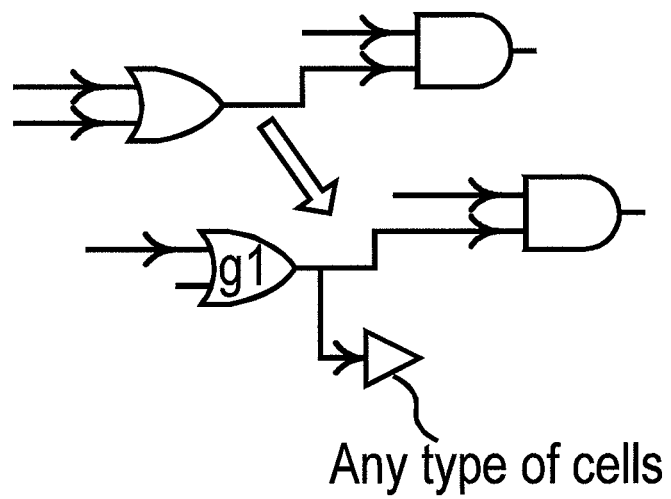

Since the reported timing is somewhat inaccurate and the available resource for padding is uncertain at early stages, the invention performs the short path padding at the post-output stage. FIGS. 5A and 5B are schematic diagrams of delay padding of short paths according to the invention. As shown in FIG. 5A, a buffer insertion is performed to increase the short path delay. As shown in FIG. 5B, an extra load capacitance is introduced to lengthen the short paths. Therefore, the inserted delay can be provided by cells and metal wires. A design is usually sprinkled with spare cells (redundant cells) at the placement stage, as well as with a dummy metal which offers an abundant resource of capacitance and can be tuned. Hence, padding at the post-layout stage can then be done by rewiring the spare cells and dummy metal. Upon Synopsys' Liberty library standards, the amount of delay increment and the amount of correspondingly inserted load/buffers can be directly converted to each other by a table lookup.

As shown in FIG. 4, the method includes a step of padding value determination and a step of load/buffer allocation.

The padding value determination step receives the placed and routed design and is based on a cell library, timing constraints, and a timing analysis report to determine padding values and locations required for each gate of the placed and routed design to output. The padding value determination step determines or generates the padding values and locations with a global view.

The load/buffer allocation step is based on a spare cell information, a dummy metal information, and the padding values and locations required for each gate of the placed and routed design to achieve the short path padding in the placed and routed design. The load/buffer allocation step is realized by introducing extra load capacitance and inserting the buffers. To achieve the assigned padding values generated in the padding value determination step, the load/buffer allocation step is divided into two stages of coarse-grained delay padding and fine-grained delay padding. The coarse-grained delay padding uses the spare cells, and the fine-grained delay padding uses a dummy metal.

Generally, the more total padding delay means the more total padding overhead. Hence, the invention first targets to minimize the total padding delay and then converts the padding delay of each gate/wire into padding load/buffers. However, there are two challenges. One is to find good location to pad the delay, and the other is not to hurt the setup time of the gate.

Figure 1:
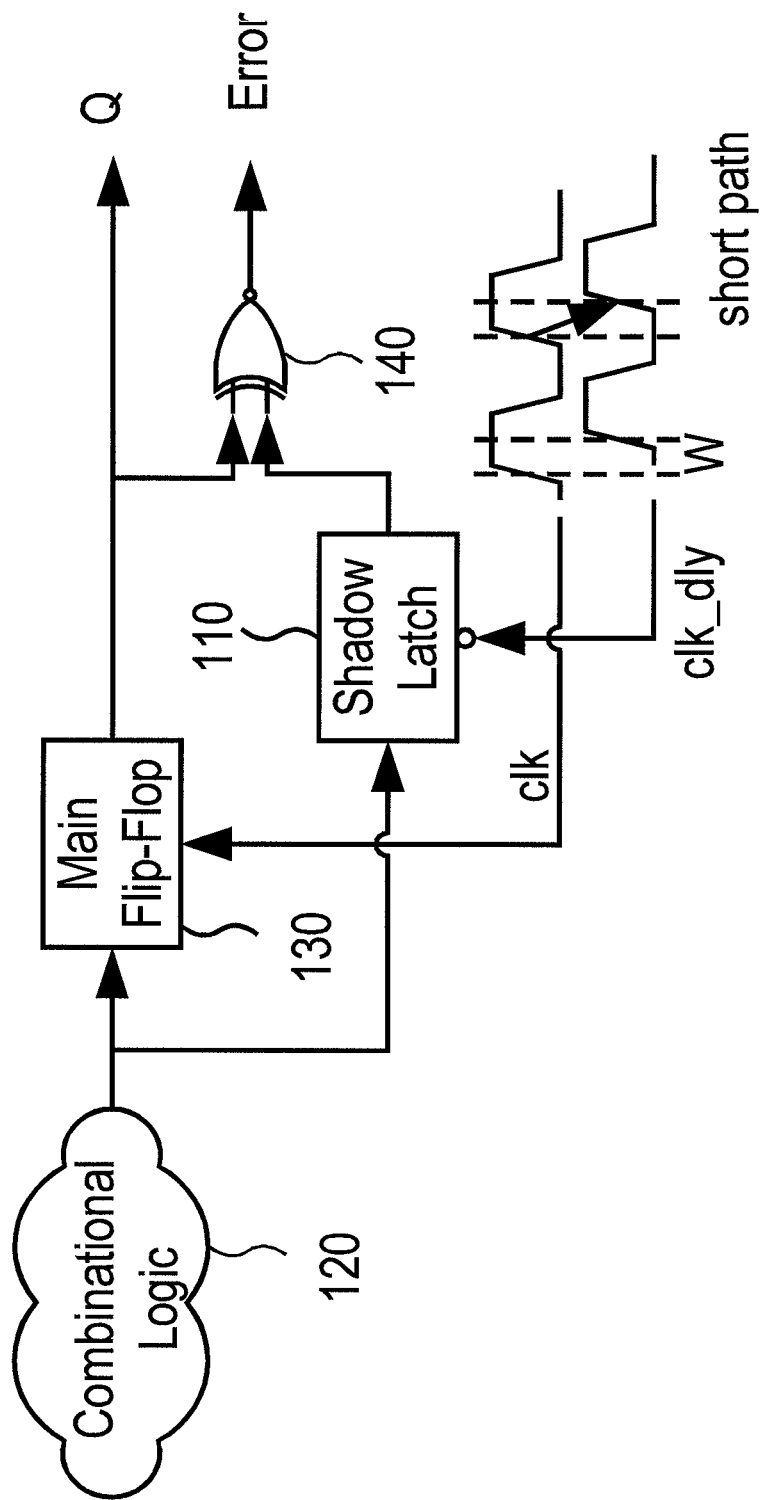
FIG. 1 is a schematic diagram of a conventional Razor flip-flop.
Figure 2:
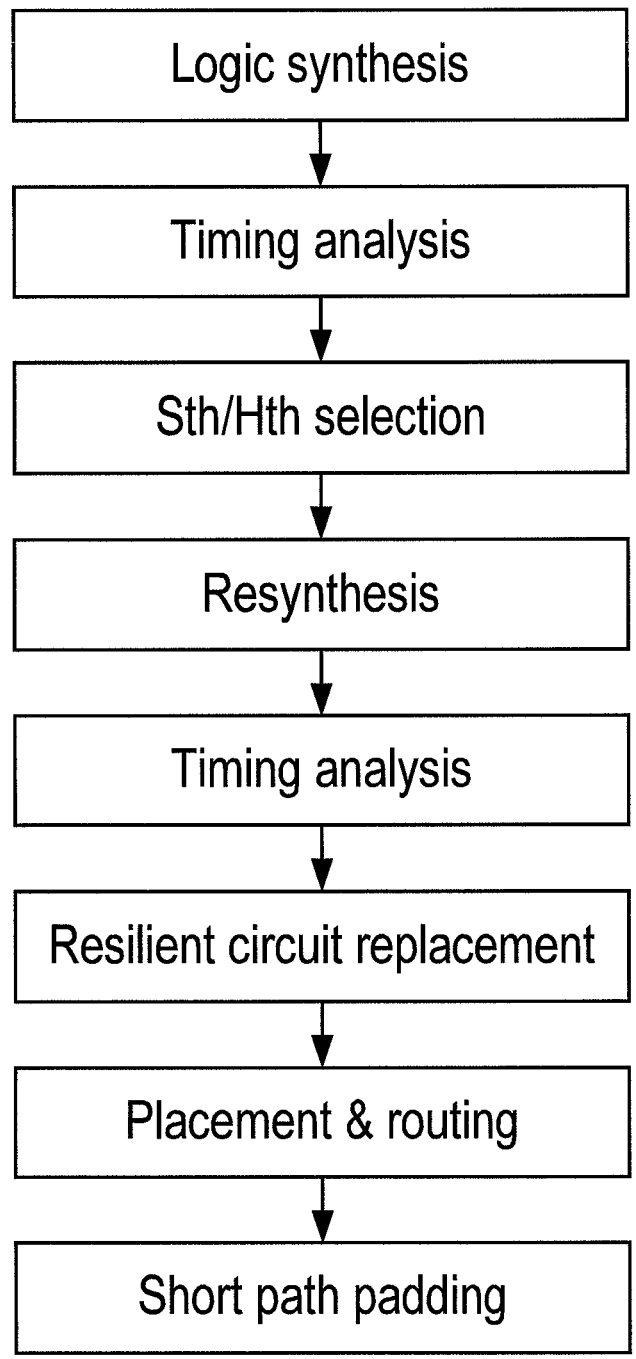
FIG. 2 is a flowchart of integrating timing error resilient circuits into a design.

The difficulty of the first challenge is that padding on gates close to primary inputs can easily satisfy the timing constraints, but may increase the total padding values. By contrast, padding on gates shared by many short paths can lower total padding values, but may violate the timing constraints. As shown in FIG. 2A, if the gates $g_2$ and $g_3$ are padded with 0.3-unit delay individually, the timing constraints are satisfied, but the total padding value is 0.6, which is somewhat large. If the gate $g_1$ is padded with 0.3-unit delay, the short path through $g_2$ to the primary output $o_1$ is unresolved. Thus, to tackle these challenges, using the global view to determine the padding values and locations is required.

The padding value determination step includes a padding resource collection, a fanout padding flexibility calculation/ flexibility checking, a padding value decision, an improvement determination, and a padding value refinement.

Since the ECO hold time fixing method is applied at the post-layout stage, the available padding resource is collected firstly. The available resource to pad each gate includes the spare cell and dummy metal information located within a bounding box of its fanout net. Thus, the padding resource collection can collect available spare cells and available dummy metal information located within a bounding box of the fanout net of a gate in the placed and routed design.

The maximum padding capacitance $C_{max}(g_i)$ of a gate $g_i$ is the minimum of the maximum output capacitance defined in the cell library and its available padding resource, and thus we have $C_{max}(g_i)=0$ for a primary output or a flip-flop (FF) input. The maximum padding capacitance $C_{max}(g_i, g_j)$ of a wire between the gates $g_i$ and $g_j$ is defined similarly. Both of the maximum padding capacitances $C_{max}(g_i)$ and $C_{max}(g_i, g_j)$ give the upper bounds but still preserve flexibilities to set the padding values.

The fanout padding flexibility calculation/flexibility checking calculates the fanout padding flexibility $P_F(g_i)$ of a gate $g_i$ in the placed and routed design. With a global view to determine the padding values and locations, the fanout padding flexibility $P_F(g_i)$ of the whole fanout cone of each hold violating gate is first calculated.

A circuit design is represented by a directed graph K=(G, E), where K is comprised of gates G and edges E, each node $g_i \in G$ represents a gate associated with a gate delay $D(g_i)$, and each edge $e(g_i, g_j) \in E$ represents a wire connecting the gates $g_i, g_j \in G$. The setup arrival time $A(g_i)$ of the output of the node $g_i$ is expressed as follows:

$A(g_i)=\max_j\{A(g_j)|e(g_i, g_j)\in E\}+D(g_i)$.

The setup required time $R(g_i)$ of the output of the node $g_i$ is expressed as follows:

$R(i)=\min_k\{R(i, k)|R(i, k)=R(k)-D(k), e(i, k)\in E\}$ $R(g_i)=\min_k\{R(g_i, g_k)|R(g_i, g_k)=R(g_k)-D(g_k), e(g_i, g_k)\in E\}$.

The hold arrival time $a(g_i)$ of the output of the node $g_i$ is expressed as follows:

$a(i)=\min_j\{a(j)|e(j, i)\in E\}+D(i)$ $a(g_i)=\min_j\{a(g_j)|e(g_j, g_i)\in E\}+D(g_i)$.

The hold required time $r(g_i)$ of the output of the node $g_i$ is expressed as follows:

$r(i)=\max_k\{r(i, k)|r(i, k)=r(k)-D(k), e(i, k)\in E\}$.

$r(g_i)=\max_k\{r(g_i, g_k)|r(g_i, g_k)=r(g_k)-D(g_k), e(g_i, g_k)\in E\}$.

The setup edge slack $S(g_i, g_j)$ of the edge $e(g_i, g_j) \in E$ contributed from the node $g_j$ back to the node $g_i$ is expressed as follows:

$S(i, j)=R(i, j)-A(i)$ $S(g_i, g_j)=R(g_i, g_j)-A(g_i)$.

The setup node slack $S(g_i)$ of the node $g_i \in G$ is expressed as follows:

$S(i)=\min_j\{S(i, j)|e(i, j)\in E\}=R(i)-A(i)$ $S(g_i)=\min_j\{S(g_i, g_j)|e(g_i, g_j)\in E\}=R(g_i)-A(g_i)$.

The hold edge slack $H(g_i, g_j)$ of the edge $e(g_i, g_j) \in E$ contributed from the node $g_j$ back to the node $g_i$ is expressed as follows:

$H(i, j)=a(i)-r(i, j)$ $H(g_i, g_j)=a(g_i)-r(g_i, g_j)$.

The hold node slack $H(g_i)$ of the node $g_i \in G$ is expressed as follows:

$H(i)=\min_j\{H(i, j)|e(i, j)\in E\}=a(i)-r(i)$ $H(g_i)=\min_j\{H(g_i, g_j)|e(g_i, g_j)\in E\}=a(g_i)-r(g_i)$.

Figure 3A:
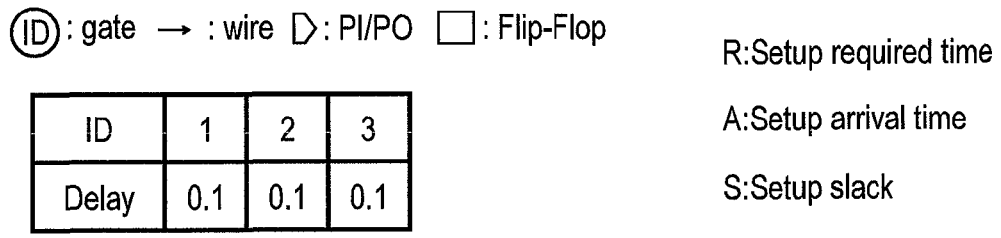
FIGS. 3A-3D are schematic charts of typical short path padding.
Figure 3A:
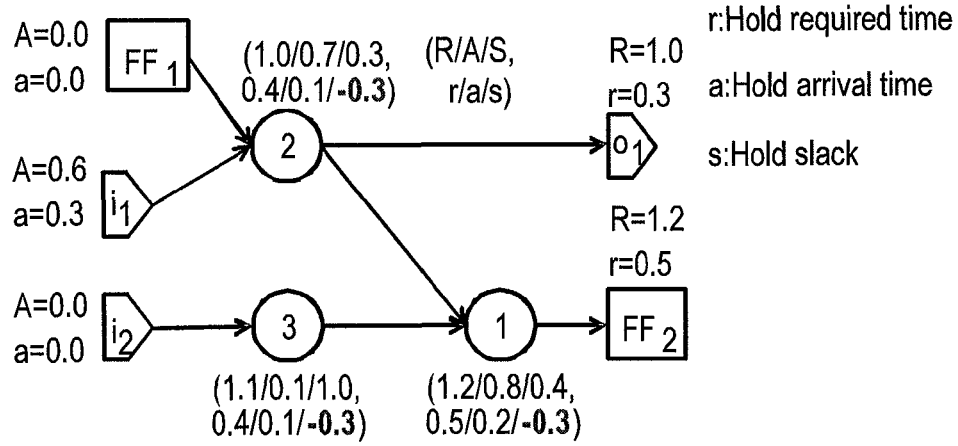
Figure 3B:
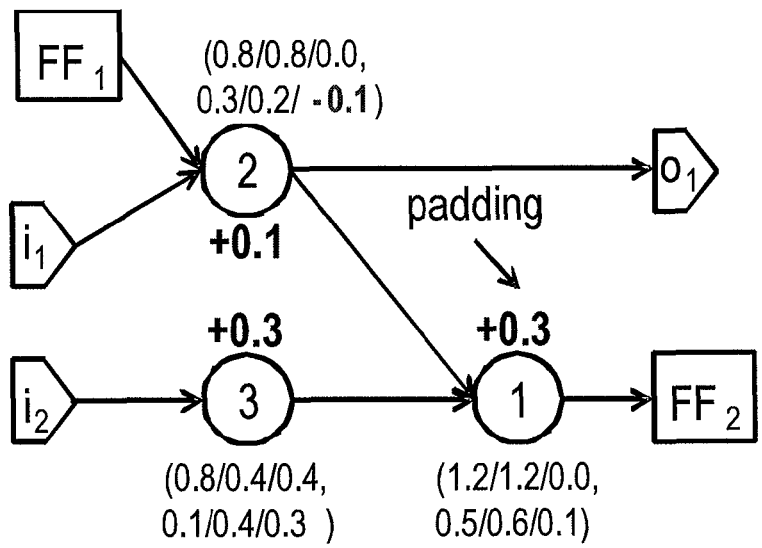
Figure 3C:
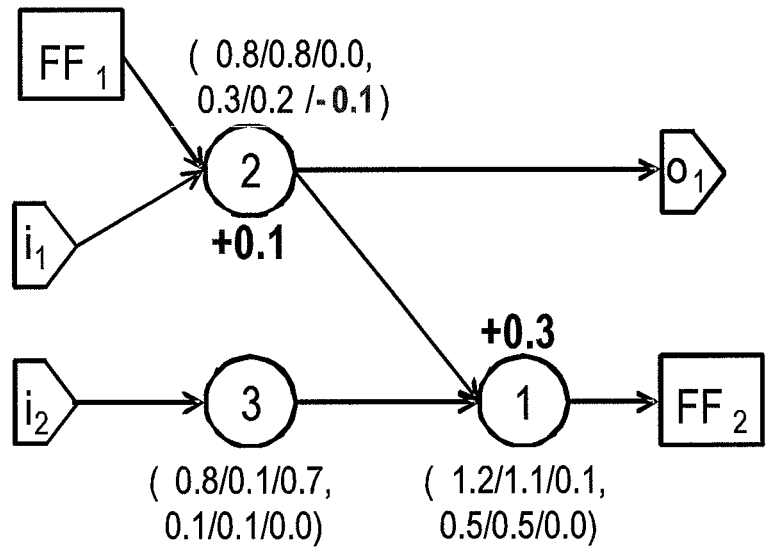
Figure 3D:
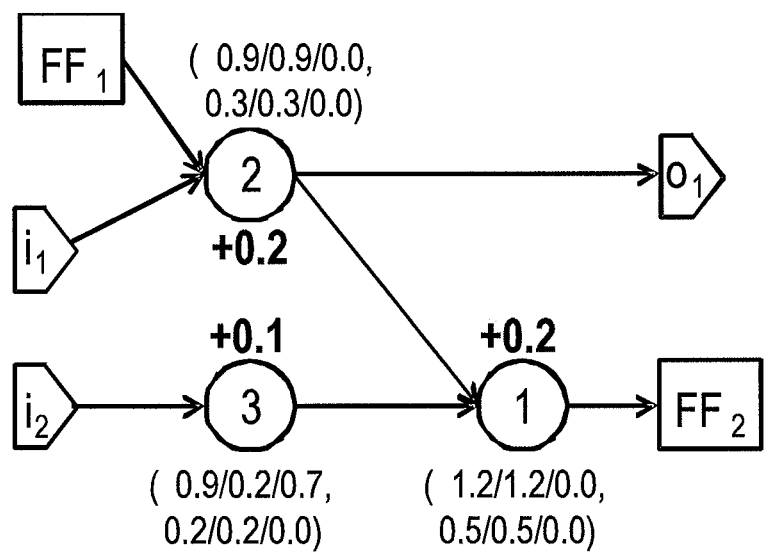

For example, as shown in FIG. 3A, $H(g_2, g_1)=0.1-0.4=-0.3$, $H(g_2, g_{o1})=0.1-0.3=-0.2$ and $H(g_2)=-0.3$ are calculated.

The safe padding value $P_{saf}(g_i)$ of each node or gate $g_i$ is expressed as follows:

$P_{saf}(i)=\min\{S(i), |\min\{0, H(i)\}|, P_{max}(i)\}$, $P_{saf}(g_i)=\min\{S(g_i), |\min\{0, H(g_i)\}|, P_{max}(g_i)\}$, where $P_{max}(g_i)$ indicates the maximum padding delay of the node or gate $g_i$ converted from the maximum padding capacitance $C_{max}(g_i)$, and $P_{max}(g_i)=0$ for a primary output or a flip-flop input.

Accordingly, the timing constraints are satisfied when the delay of a node $g_i$ on a short path is increased by t, for $t \leq P_{saf}(g_i)$.

The fanout padding flexibility $P_F(g_i)$ of the node $g_i \in G$ is expressed as follows:

$$P_F(i) = \begin{cases} 0, & g_i \in PO \text{ or } H(i) \geq 0; \\ \min\{0, \min_{e(i,j) \in E}\{H'(i, j)\}\} - H(i), & \text{otherwise.} \end{cases}$$

$$P_F(g_i) = \begin{cases} 0, & g_i \in PO \text{ or } H(g_i) \geq 0; \\ \min\left\{0, \min_{e(g_i, g_j) \in E}\{H'(g_i, g_j)\}\right\} - H(g_i), & \text{otherwise} \end{cases}$$

where $H'(i, j) =$
$H(i, j) + P_F(j) + P_{saf}(j) = H'(g_i, g_j) = H(g_i, g_j) + P_F(g_j) + P_{saf}(g_j)$.

In addition, we have:

$H'(i) = \min_j\{H'(i, j), e(i, j) \in E\}$, $S'(i) = \min_j\{S(i, j) - (S'(j)) - P_{saf}(j) | e(i, j) \in E\}$ $H'(g_i) = \min_j\{H'(g_i, g_j), e(g_i, g_j) \in E\}$, $S'(g_i) = \min_j\{S'(g_i, g_j) - (S'(g_j) - S(g_j)) - P_{saf}(g_j), e(g_i, g_j) \in E\}$.

$H'(g_i)$ and $S'(g_i)$ represent the updated slacks when the fanout cone is padded with the maximum allowable delay, and accordingly $P_{saf}(g_i)$ is dynamically updated.

The invention defines the fanout padding flexibility $P_F(g_i)$ for each gate $g_i$ to reflect the maximum padding value allowed on the whole fanout cone of the gate gi. For a hold satisfying gate or a primary output, the fanout padding flexibility $P_F(g_i)$ is 0. For a hold violating gate $g_i$, the fanout padding flexibility $P_F(g_i)$ is the difference between its current hold slack H(i) $H(g_i)$ and the minimum updated hold edge slack over all fanout edges when each fanout is padded with the maximum allowable value.

By the cited equations, the fanout padding flexibility $P_F(g_i)$ is thus calculated from primary outputs toward primary inputs. From the case shown in FIG. 3A and upon the cited equations, the parameters are obtained as follows:

$P_F(g_{o1}) = 0.0, PF(FF2) = 0.0$;

$P_F(g_1) = \min\{0, (-0.3 + 0.0 + 0.0)\} - (-0.3) = 0.0$;

$H'(g_1) = -0.3, S'(g_1) = 0.4$;

-continued $P_F(g_2) = \min\{0, (-0.2 + 0.0 + 0.0), (-0.3 + 0.0 + 0.3)\} - (-0.3) = 0.1;$ $H'(g_2) = \min\{(-0.3 + 0.0 + 0.3), (-0.2 + 0.0 + 0.0)\} = -0.2;$ $S'(g_2) = \min\{(0.4 - 0.0 - 0.3), (0.3 - 0.0 - 0.0)\} = 0.1;$ $P_F(g_3) = \min\{(-0.3 + 0.0 + 0.3), 0.0\} - (-0.3) = 0.3;$ $H'(g_3) = \min\{(-0.3 + 0.0 + 0.3)\} = 0.0;$ and $S'(g_3) = \min\{(1.0 - 0.0 - 0.3)\} = 0.7.$ Upon the cited equations, the fanout padding flexibility $P_F(g_i)$ can be checked as follows:

If $|\min\{0, H(i)\}|>P_F(i)$, $g_i \in PI$, $|\min\{0, H(g_i)\}|>P_F(g_i)$, $g_i \in PI$, where PI stands for primary input, the hold violations cannot be resolved by padding gates; and if $S(i, j)<|\min\{0, H(i, j)\}|$, $e(i, j) \in E$, $S(g_i, g_j)<|\min\{0, H(g_i, g_j)\}|$, $e(g_i, g_j) \in E$, the hold violations cannot be resolved by padding wires.

The padding value decision is based on the fanout padding flexibility $P_F(g_i)$ of a gate to calculate a padding value $P(g_i)$ of the gate. After the fanout padding flexibility $P_F(g_i)$ is calculated with a global view, the padding value is decided accordingly. The padding value of each hold violating gate $g_i$ is derived in the topological order. For each hold violating gate $g_i$, the fanout padding flexibility can be considered as the maximum allowable delay padded on its fanout cone. Thus, the hold violating gate $g_i$ only needs to be padded to fix the remaining negative hold slack, i.e., the difference between the safe padding value and the fanout padding flexibility $P_F(g_i)$. Upon the cited equations, the padding value of the gate $g_i$ is expressed as follows:

$P(i) = \max\{P_{saf}(i) - P_F(i), 0\}$ $P(g_i) = \max\{P_{saf}(g_i) - P_F(g_i), 0\}.$ The parameter $P_{saf}(g_i)$ represents the safe padding value after the fanin gates of a gate $g_i$ are padded. When the padding value of each gate $g_i$ is decided, the increased delay affects the arrival time of its fanout gates. Therefore, the fanout edge slack of the padding gate is updated accordingly. The updated fanout edge slack is expressed as follows:

$S(i, j) = R(i, j) - A(i) - P(i)$ $H(i, j) = P(i) + a(i) - r(i, j)$ $S(g_i, g_j) = R(g_i, g_j) - A(g_i) - P(g_i),$ $H(g_i, g_j) = P(g_i) + a(g_i) - r(g_i, g_j).$

After updating the fanout edge slacks of each padding gate $g_i$, the setup and hold node slacks of its fanout gates are also updated.

Figure 6A:
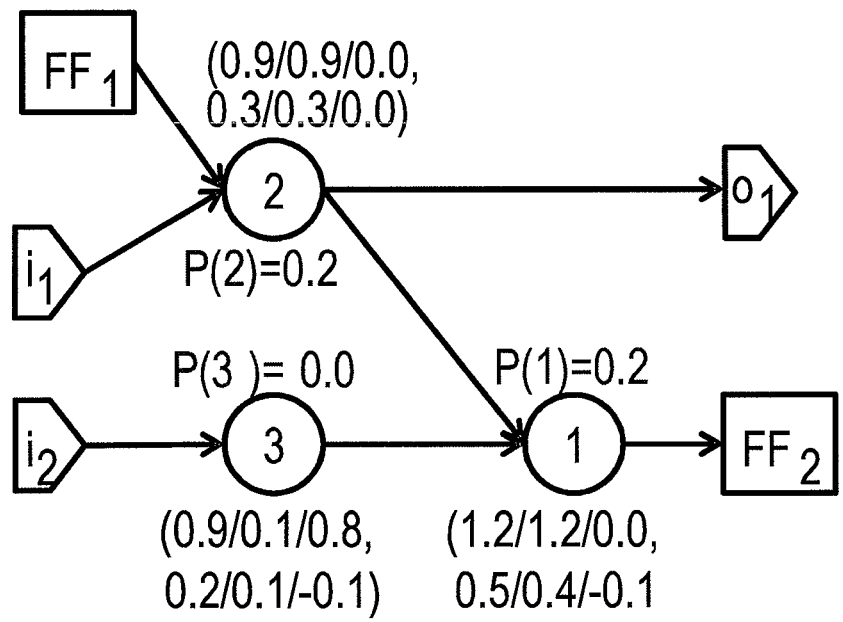
FIGS. 6A and 6B are schematic charts of applying padding values to a placed and routed design according to the invention.
Figure 6B:
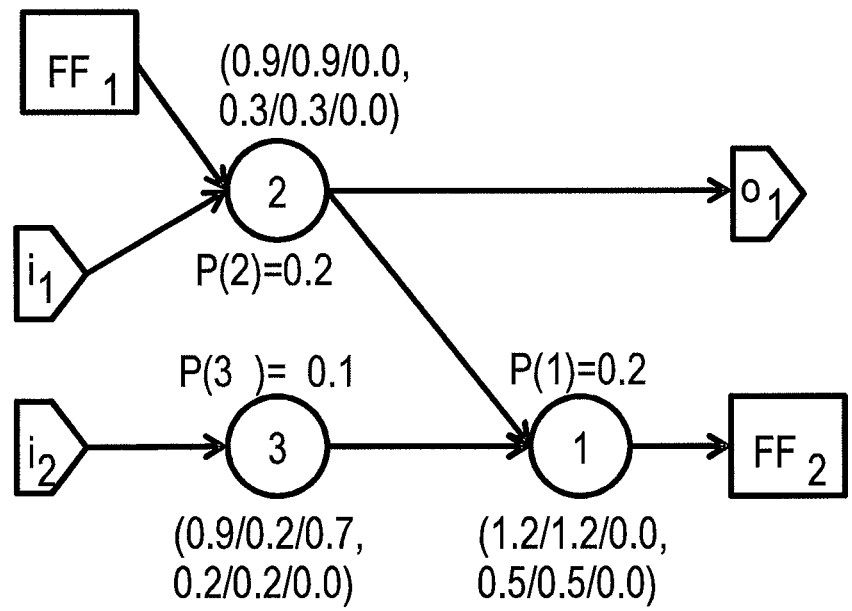

FIGS. 6A and 6B are schematic charts of applying padding values to a placed and routed design according to the invention. FIG. 6A gives an example of padding value decision, when assuming $P_{max}(g_2)=0.5$, $P_{max}(g_3)=0.4$, $P_{max}(g_1)=0.4$, respectively. Based on the fanout padding flexibility $P_F(g_i)$, the parameters are obtained as follows:

$P_{saf}(g_2) = \min\{0.3, |-0.3|, 0.5\} = 0.3, P(g_2) = 0.3 - 0.1 = 0.2;$ $S(G_2, g_1) = 1.1 - 0.7 - 0.2 = 0.2, H(g_2, g_1) = 0.2 + 0.1 - 0.4 = -0.1;$ $P_{saf}(g_3) = \min\{0.3, |-0.3|, 0.4\} = 0.3, P(g_3) = 0.3 - 0.3 = 0.0;$ $S(g_3, g_1) = 1.1 - 0.1 - 0.0 = 1.0, H(g_3, g_1) = 0.0 + 0.1 - 0.4 = -0.3;$ $S(g_1) = \min\{1.0, 0.2\} = 0.2, H(g_1) = \{-0.3, -0.1\} = -0.3;$ and $P_{saf}(g_1) = \min\{0.2, |-0.3|, 0.4\} = 0.2, P(g_1) = 0.2 - 0.0 = 0.2.$ After the padding value decision, it is found from FIG. 6A that the short path from the gate $g_3$ to the gate $g_1$ still has a negative hold slack, −0.1, because of the over-estimated fanout padding flexibility $P_F(g_i)$. This short path can be resolved by applying another iteration of fanout padding value calculation/flexibility checking plus padding value decision, and the obtained padding values are accumulated to have the result as shown in FIG. 6B, where all short paths are resolved. The fanout padding flexibility calculation/flexibility checking step and the padding value decision step are repeated until all hold violations are resolved or further improved. Next, the improvement determination step determines whether all hold violations of the short paths of each gate in the placed and routed design are resolved or no more violation is eliminated. When any violation is not resolved or eliminated, the procedure returns to the fanout padding flexibility calculation/flexibility checking step.

The invention intents to further reduce the total padding delay on the gates and resolve unfixed hold violations by padding wires, thereby increasing the delay.

In the padding value decision step, the padding locations are selected as close to primary outputs PO as possible. For a circuit with forked short paths, the total padding value is increased if the padding location is not determined on the gate where two or more short paths fork. As shown in FIG. 6A, the total padding delay is 0.5 according to the cited calculation. However, while the gate g4 has forked paths, the total padding delay can be further reduced to 0.4 by changing the padding values and locations as shown in FIG. 6B.

The invention intents to further reduce the padding value by pushing the padding values toward the gates where more short paths fork. When the improvement determination step determines that all hold violations of the short paths of each gate in the placed and routed design are resolved or no more violation is eliminated, the padding value refinement step is based on a reverse topological order to calculate the refined padding value of a gate in the placed and routed design in order to further reduce the padding value of the gate.

To achieve this, a reverse padding value Prev(i) for the gate $g_i$ is defined as follows:

$P_{rev}(i) = \begin{cases} P(i), & \text{if } g_i \text{ has only one hold violating } fanin; \\ 0, & \text{otherwise.} \end{cases}$ $P_{rev}(g_i) = \begin{cases} P(g_i), & \text{if } g_i \text{ has only one hold violation } fanin; \\ 0, & \text{otherwise.} \end{cases}$ The reverse padding value $P_{rev}(g_i)$ of the gate $g_i$ is to record how much padding is able to be propagated backward to its fanin gate. To avoid propagating padding values to jointed paths, assume that the gate $g_i$ has only one fanin with a hold violation. When the hold edge slack is smaller than the padding value of the gate $g_i$, it indicates that a fanin of the gate $g_i$ has a hold violation. In this case, the original hold violations can be shown from the updated result after the padding.

Further, an added safe padding value $P_{add}(g_i)$ of the gate $g_i$ is defined as follows:

$P_{add}(i) = \min\{S(i), P_{max}(i) - P(i)\}.$ $P_{add}(g_i) = \min\{S(g_i), P_{max}(g_i) - P(g_i)\}.$ The added safe padding value $P_{add}(g_i)$ of the gate $g_i$ is to record how much padding is able to be added under the setup constraints and the maximum padding delay $P_{max}(g_i)$. The refined padding value $P_{ref}(g_i)$ of the gate $g_i$ is expressed as follows:

$$P_{ref}(i)=P(i)+\min\{P_{add}(i), \min_j\{P_{rev}(j)|H(i,j)<P(i)\}.$$

$$P_{ref}(g_i)=P(g_i)+\min\{P_{add}(g_i), \min_j\{P_{rev}(g_j)|H(g_i, g_j)<P(g_i)\}\}.$$

Based on the above definitions, the refined padding values are calculated in the reverse topological order, and thus the total padding delay can be further reduced.

In case of insufficient setup slacks or maximum output capacitance constraints, the hold violations cannot be fully cleaned by the padding gates. In this case, after the above refinement, the invention further applies padding wires to thereby resolve the remaining hold violations. Namely, the padding value refinement further includes a wire padding value step.

The wire padding value step calculates a wire padding value for a wire $e(g_i, g_j)$, so as to further reduce the padding values of each gate/wire in the placed and routed design. The wire padding value $P(g_i, g_j)$ is expressed as follows:

$$P(i,j)=\min\{S(i,j), |\min\{0, H(i,j)\}|\}$$

$$P(g_i, g_j)=\min\{S(g_i, g_j), |\min\{0, H(g_i, g_j)\}|\}.$$

The wire padding value $P(g_i, g_j)$ is determined in the topological order. According to the timing library, the final padding delay of each gate/wire is converted to an amount of padding load or padding buffers.

The load/buffer allocation step includes a finding spare cell candidate step, a spare cell selection step, and a dummy metal allocation step.

To achieve the padding values generated in the padding value decision step, the load/buffer allocation step is divided into two stages of coarse-grained delay padding and fine-grained delay padding.

The delay for each cell can be found by converting the capacitance of the cell obtained from the cell library. Since the available cell capacitances/delays are discrete for a given cell library, spare cells may not match the required padding load/buffer for a padding gate/wire. Therefore, the coarse-grained padding is done by spare cells, and the fine-grained delay padding is done by dummy metal insertion.

Figure 7:
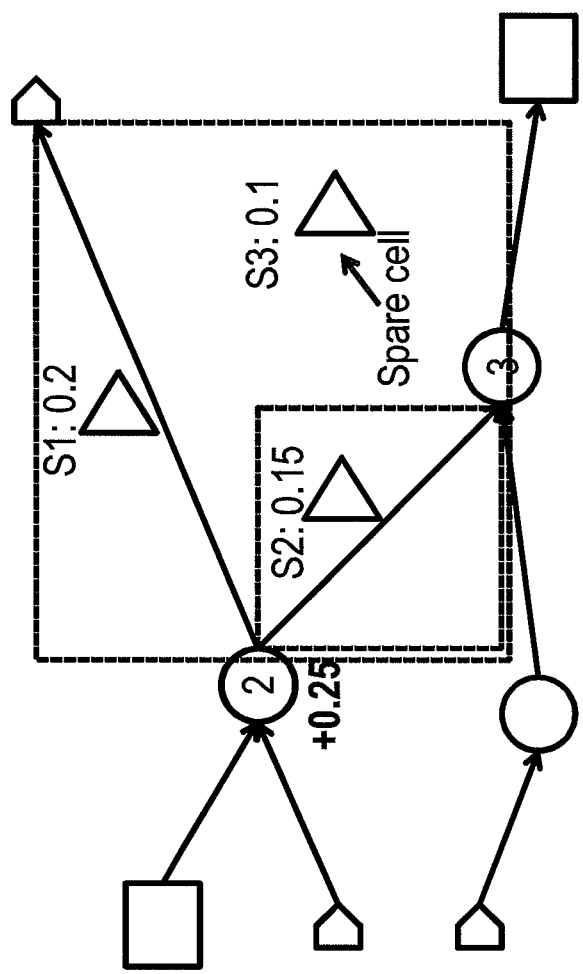
FIG. 7 is a schematic chart of available spare cells within a bounding box according to the invention.

The finding spare cell candidate step generates spare cell candidates for each padding gate/wire in the placed and routed design. For each padding gate, the available spare cells located within the bounding box of its fanout net are programmed as the available resource for a padding gate. FIG. 7 is a schematic chart of available spare cells within a bounding box according to the invention. As shown in FIG. 7, the available spare cells of the padding gate $g_2$ are $s_1$, $s_2$, and $s_3$ while that of the wire between the gates $g_2$ and $g_3$ is $s_2$. Next, how to pad the gate/wire by the spare cells is decided. The amount of delay offered by the spare cells and related rewiring needs to be as close to the determined padding delay for each gate as possible but does not exceed the determined padding value, so as to avoid the timing violations.

The invention reduces the task of finding suitable spare cell candidates for a single padding gate/wire to the subset sum problem, which can optimally be solved by dynamic programming. The step size of the dynamic programming is selected to keep a balance between the precision and the efficiency. For example, as shown in FIG. 7, the assigned padding delay of a padding gate $g_2$ is 0.25, and its available spare cells are $s_1$, $s_2$, and $s_3$. FIG. 8 lists the dynamic programming table for the subset sum problem, where the step size used herein is 0.05. It is seen that the combination of $s_2$ and $s_3$ is the optimal at the padding delay of 0.25. Accordingly, the spare cells $s_2$ and $s_3$ are recorded as the spare cell candidates of $g_2$. Similarly, the spare cell candidates for a padding wire can be extracted.

Figure 9:
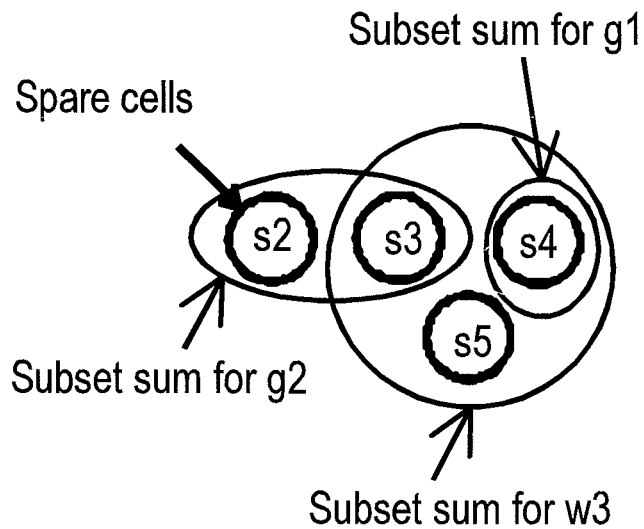
FIG. 9 is a schematic chart of a spare cell competition according to the invention.

However, the subset sum solutions for different padding gates/wires may compete for the same spare cell. FIG. 9 is a schematic chart of a spare cell competition according to the invention. As shown in FIG. 9, both $g_1$ and $g_2$ desire to be padded by $s_3$. To deal with the resource competition problem, multiple subset sum solutions within a user-defined tolerance are recorded as the spare cell candidates. As shown in FIG. 8, if the padding value is 0.25 and the tolerance is 0.05, both $\{s_1\}$ and $\{s_2, s_3\}$ are recorded as the spare cell candidates. Next, it is determined to assign which spare cells for each padding gate/wire.

The spare cell selection step assigns the best or optimal subset sum solution to each padding gate/wire to completely pad the short paths in the placed and routed design.

Figure 10:
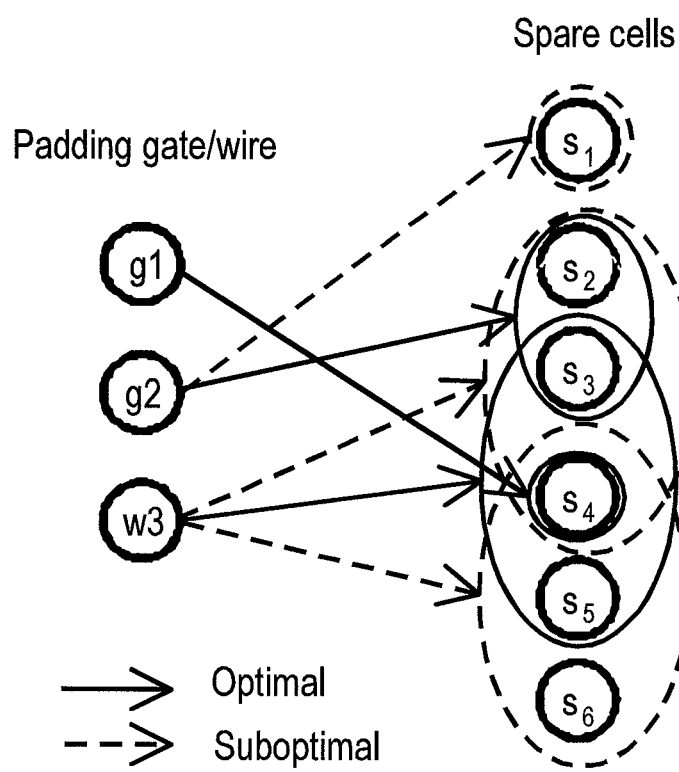
FIG. 10 is a schematic chart of optimal selections between padding gates/wires and spare cells according to the invention.

Since the subset sum solutions for different padding gates/wires may compete for the same spare cell, there is a resource competition problem among the spare cells. Therefore, several sets of spare cell candidates are recorded for each padding gate/wire. The spare cell selection step determines the spare cells for each padding gate/wire. The spare cell selection problem is NP-hard, which can be reduced from the set packing problem. To do it efficiently, each padding gate/wire is first assigned to its best subset sum solution. If there are conflicts, the conflicted padding gates/wires and their multiple subset sum solutions are extracted. The conflicted padding gates/wires are sorted in an ascending order of the number of their recorded subset sum solutions. Each gate is assigned to their best and available set of spare cell candidates in the sorted order. FIG. 10 is a schematic chart of best or optimal selections between padding gates/wires and spare cells according to the invention. As shown in FIG. 10, the gate $g_1$ corresponds to the spare cell $\{s_4\}$, the gate $g_2$ corresponds to the spare cells $\{s_2, s_3\}$, and the gate $g_3$ corresponds to the spare cells $\{s_5, s_6\}$.

At the above coarse-grained delay padding step, the spare cells are selected for each padding gate/wire. If the selected spare cells cannot match the required padding delay, the remaining padding is converted into an amount of capacitance, and fixed by the dummy metal insertion during the fine-grained padding step. Thus, the dummy metal allocation step can use the dummy metal insertion to completely pad the short paths in the placed and routed design.

Figure 11:
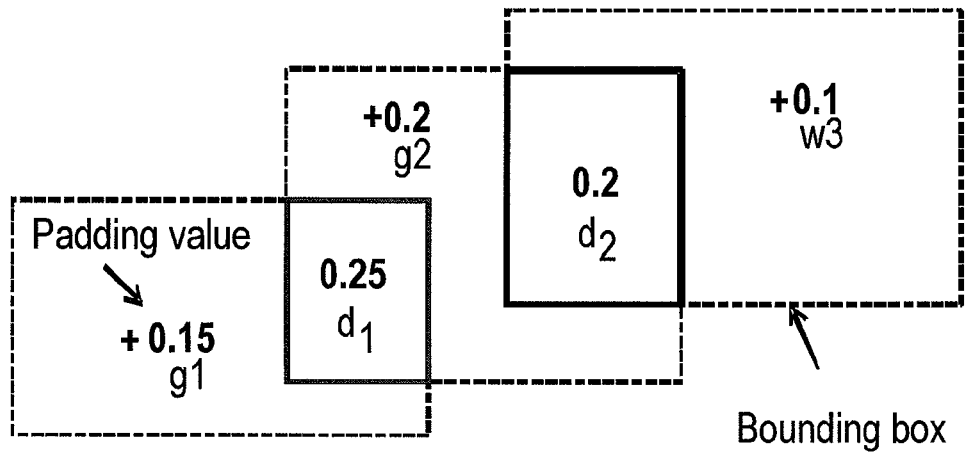
FIG. 11 is a schematic diagram of a dummy metal of conflicted padding gates/wires according to the invention.

The amount of available dummy metal of each padding gate is decided by the unoccupied routing resource within the bounding box of its fanout net. As their corresponding bounding boxes overlap, different padding gates/wires may compete for the same metal resource. FIG. 11 is a schematic diagram of a dummy metal of conflicted padding gates/wires according to the invention. The dummy metal in independent bounding boxes is defined as the independent virtual metal, and otherwise defined as the dependent virtual metal. The dummy metal in the independent bounding boxes are first assigned for the padding gates/wires. If there still are padding gates/wires with unfixed padding capacitance, a maximum flow network process is used to assign the dependent virtual metal.

Figure 12:
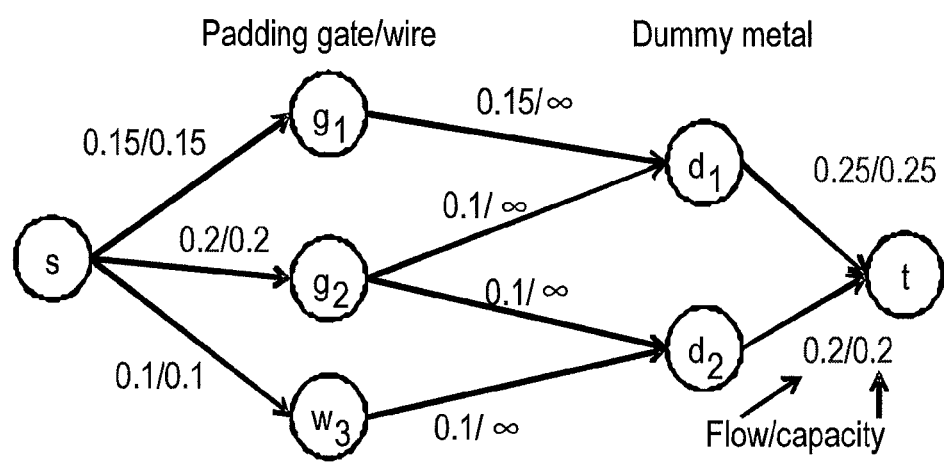
FIG. 12 is a schematic chart of a maximum flow network process according to the invention.

FIG. 12 is a schematic chart of a maximum flow network process according to the invention. The maximum flow network process includes a source node s and a sink node t. Nodes $g_i$ and $d_i$ corresponding to each padding gate/wire indicate the dependent virtual metal. An edge connects the node s to each node $g_i$, and its edge capacity is the remaining padding capacitance of the node $g_i$. An edge connects each node $d_i$ to the node t, and its edge capacity is the amount of capacitance of the node $d_i$. If the bounding box of the node $g_i$ covers the node $d_i$, the edge capacity of an edge connecting between the nodes $g_i$ and the nodes $d_i$ is infinite. As shown in FIG. 11, after assigning the independent dummy metal, there are the gates $g_1$, $g_2$, and $g_3$ with remaining unfixed padding capacitances 0.15, 0.2, and 0.1 respectively. The dummy metal of overlapping regions can offer capacitances 0.25 and 0.2. The corresponding flow network and the maximum flow are shown in FIG. 12. Based on the obtained flow, the dummy metal can be accordingly assigned to fix the remaining padding capacitance. If there are still unfixed padding capacitances after the dummy metal insertion, it means that the resource is limited, and in this case the procedure returns to the padding value determination step to adjust the padding values not exceeding the load of a gate with fewer resources.

FIG. 13 is a table of benchmark statistics according to the invention, where "Circuit" indicates the circuit name, "#Gate" indicates the combinational logic count, "#FF" indicates the number of flip-flops, "#SFF" indicates the number of timing suspicious flip-flops, "Conservative clock period (ns)" indicates the clock period considering a timing guardband, and "THS" indicates the total negative hold slack contributed from suspicious flip-flops. Each circuit is synthesized, placed, and routed based on 55-nm technology using state-of-the-art commercial tools provided by Synopsys and Cadence. The tools are also used to verify the circuit timing. The invention assumes that $S_{th}$=75% and $H_{th}$=25%, which are typical settings in modern designs.

FIGS. 14A and 14B are a comparison table of padding values for the invention and the prior art, where "Padding delay" indicates the total assigned padding delay including all gates and wires, "LP" means "Linear Programming" proposed in N. V. Shenoy et al. "Minimum padding to satisfy short path constraints." the ICCAD, pp. 156-161, 1993, which is implemented using ILOG CPLEX Optimizer provided by IBM, "Greedy 1" indicates to greedily pad from the gate with the largest setup slack proposed by Y. Sun et al. in U.S. Pat. No. 7,278,126, and "Greedy 2" indicates to greedily pad from the gate passed by most hold violating paths. As shown in FIGS. 14A and 14B, it is known that, because of the global view, the method can clean all hold violations of each circuit. The linear programming (LP) method is time consuming for large-scale circuits. Greedy 1 and Greedy 2 may either fail to clean all hold violations or suffer from long runtime due to iterative computation.

FIG. 15 is a comparison table of negative setup slack/negative hold slack of the invention and the prior art, where the load/buffer allocation method is compared with the method proposed by N. V. Shenoy et al. As mentioned above, even the method proposed by N. V. Shenoy et al. finds the optimal padding, the directly mapped results may still incur hold violations. In contrast, based on two stages of the coarse-grained and the fine-grained load/buffer allocations, the invention can successfully achieve the padding values assigned by the padding value determination step for all cases. The combination of the spare cells and the dummy metal provides the flexibility to the capacitance allocation, and thus the dummy metal plays an important role in solving the discrete buffer delay problem.

In view of the foregoing, it is known that the invention is provided with the contributions as follows:

(1) Finding the padding values with a global view: The greedy heuristics proposed by the prior arts may fail to fix all hold violations due to the local views. However, the invention computes the padding flexibility of the fanout cone of each gate and accordingly determines the padding value for each gate with the global view.

(2) Coarse-grained and fine-grained delay padding: Since the amount of delay offered by a cell library is discrete, the coarse-grained delay padding is done using the spare cells, and the fine-grained delay padding is done using the dummy metal insertion because the dummy metal can be tuned as needs.

(3) Short path padding at the post-layout stage: Because the prior art determines the padding values at the logic re-synthesis stage, its timing report is not somewhat correct. In addition, because the available resource of padding is uncertain at the early stages, the invention realizes the delay padding at the post-layer stage.

As cited, based on the above observation, the invention first tries to reduce the padding values and determine the padding locations in the padding value determination stage, then allocates the load/buffers in the load/buffer allocation stage in order to satisfy the padding values determined in the padding value determination stage. Furthermore, in the padding value determination stage, the invention computes the padding flexibility of the fanout cone of each gate and accordingly determines the padding value for each gate with the global view. In the load/buffer allocation stage, to achieve the padding value determined in the padding value determination stage, the invention proposes the coarse-grained delay padding and the fine-grained delay padding. Since the delay offered by the cell library is discrete, the coarse-grained delay padding is done using the spare cells, and the fine-grained delay padding for the remainders is done using the dummy metal insertion because the dummy metal offers an abundant resource of capacitance and can be tuned.

Although the present invention has been explained in relation to its preferred embodiment, it is to be understood that many other possible modifications and variations can be made without departing from the spirit and scope of the invention as hereinafter claimed.

What is claimed is:

1. A computer-based engineering change order hold time fixing method executed by using a non-transitory computer readable medium for fulfilling a short path padding in a placed and routed design by a minimum capacitance insertion, comprising:

a padding value determination step, which receives the placed and routed design and is based on a cell library, timing constraints, and a timing analysis report to determine padding values and locations required for each gate of the placed and routed design to output; and a load/buffer allocation step, which is based on a spare cell information, a dummy metal information, and the padding values and locations to achieve the short path padding in the placed and routed design;

wherein the padding value determination step comprises:

a padding resource collection step, which is based on the spare cell information, the dummy metal information to collect available spare cells and available dummy metal information located within a bounding box of a fanout net of a gate in the placed and routed design;

a fanout padding flexibility calculation/flexibility checking step, which calculates a fanout padding flexibility $P_F(g_i)$ of the gate $g_i$ in the placed and routed design;

a padding value decision step, which is based on the fanout adding flexibility $P_F(g_i)$ of the gate $g_i$ to calculate a padding value of the gate;

an improvement determination step, which determines whether all hold violations of short paths of each gate in the placed and routed design are resolved or no more violation is eliminated, and returns to the fanout padding flexibility calculation/flexibility checking step when a violation is not resolved or eliminated; and a padding value refinement step, which is based on a reverse topological order to calculate a refined padding value of the gate in the placed and routed design when all hold violations of short paths of each gate in the placed and routed design are resolved or no more violation is eliminated, so as to further reduce the padding value of the gate; and wherein the load/buffer allocation step comprises:

a finding spare cell candidate step, which generates spare cell candidates for each padding gate/wire in the placed and routed design, such that for each padding gate, the available spare cells located within the bounding box of the fanout net are programmed as an available resource for a padding gate;

a spare cell selection step, which assigns an optimal subset sum solution to each padding gate/wire to completely pad the short paths in the placed and routed design; and a dummy metal allocation step, which use a dummy metal insertion to completely pad the short paths in the placed and routed design; and wherein the placed and routed design is represented by a directed graph $K=(G, E)$, where K is comprised of gates G and edges E, each node $g_i \in G$ represents a gate associated with a gate delay $D(g_i)$, and each edge $e(g_i, g_j) \in E$ represents a wire connecting the gates $g_i, g_j \in G$, such that a setup arrival time $A(g_i)$ of an output of the node $g_i$ is expressed as:

$A(g_i) = \max_j\{A(g_j)|e(g_i, g_j) \in E\} + D(g_i)$, a setup required time $R(g_i)$ of the output of the node $g_i$ is expressed as:

$R(g_i) = \min_k\{R(g_i, g_k)|R(g_i, g_k)=R(g_k)-D(g_k), e(g_i, g_k) \in E\}$, a hold arrival time $a(g_i)$ of the output of the node $g_i$ is expressed as:

$a(g_i) = \min_j\{a(g_j)|e(g_i, g_i) \in E\} + D(g_i)$, and a hold required time $r(g_i)$ of the output of the node $g_i$ is expressed as:

$r(g_i) = \min_k\{r(g_i, g_k)|r(g_i, g_k)=r(g_k)-D(g_k), e(g_i, g_k) \in E\}$.

2. The method as claimed in claim 1, wherein a setup edge slack $S(g_i, g_j)$ of the edge $e(g_i, g_j) \in E$ E contributed from the node $g_i$ to the node $g_j$ is expressed as:

$S(i, j) = R(i, j) - A(i)$, $S(g_i, g_j) = R(g_i, g_j) - A(g_i)$, a setup node slack $S(g_i)$ of the node $g_i \in G$ is expressed as:

$S(i) = \min_j\{S(i, j)|e(i, j) \in E\} = R(i) - A(i)$ $S(g_i) = \min_j\{S(g_i, g_j)|e(g_i, g_j) \in E\} = R(g_i) - A(g_i)$, a hold edge slack $H(g_i, g_j)$ of the edge $e(g_i, g_j) \in E$ contributed from the node $g_i$ to the node $g_j$ is expressed as:

$H(i, j) = a(i) - r(i, j)$ $H(g_i, g_j) = a(g_i) - r(g_i, g_j)$, and a hold node slack $H(g_i)$ of the node $g_i \in G$ is expressed as:

$H(i) = \min_j\{H(i, j)|e(i, j) \in E\} = a(i) - r(i)$ $H(g_i) = \min_j\{H(g_i, g_j)|e(g_i, g_j) \in E\} = a(g_i) - r(g_i)$.

3. The method as claimed in claim 2, wherein a safe padding value $P_{saf}(g_i)$ of each node $g_i$ is expressed as:

$P_{saf}(i) = \min\{S(i), |\min\{0, H(i)\}|, P_{max}(i)\}$, $P_{saf}(g_i) = \min\{S(g_i), |\min\{0, H(g_i)\}|, P_{max}(g_i)\}$.

4. The method as claimed in claim 3, wherein a fanout padding flexibility $P_F(g_i)$ of the node $g_i \in G$ is expressed as:

$$P_F(i) = \begin{cases} 0, & g_i \in PO \text{ or } H(i) \geq 0; \\ \min\{0, \min_{e(i,j) \in E}\{H'(i,j)\}\} - H(i), & \text{otherwise.} \end{cases}$$

$$P_F(g_i) = \begin{cases} 0, & g_i \in PO \text{ or } H(g_i) \geq 0; \\ \min\left\{0, \min_{e(g_i, g_j) \in E}\{H'(g_i, g_j)\}\right\} - H(g_i), & \text{otherwise;} \end{cases}$$

where $H'(i, j) = H(i, j) + P_F(j) + P_{saf}(j)$. $H'(g_i, g_j) = H(g_i, g_j) + P_F(g_j) + P_{saf}(g_j)$.

5. The method as claimed in claim 4, wherein the padding value $P(g_i)$ of the gate is expressed as:

$P(i) = \max\{P_{saf}(i) - P_F(i), 0\}$ $P(g_i) = \max\{P_{saf}(g_i) - P_F(g_i), 0\}$.

6. The method as claimed in claim 5, wherein a reverse padding value $P_{rev}(g_i)$ for the gate $g_i$ is expressed as:

$$P_{rev}(i) = \begin{cases} P(i), & \text{if } g_i \text{ has only one hold violating } fanin; \\ 0, & \text{otherwise.} \end{cases}$$

$$P_{rev}(g_i) = \begin{cases} P(g_i), & \text{if } g_i \text{ has only one hold violation } fanin; \\ 0, & \text{otherwise;} \end{cases}$$

an added safe padding value $P_{add}(g_i)$ of the gate $g_i$ is defined as:

$P_{add}(i) = \min\{S(i), P_{max}(i) - P(i)\}$;

$P_{add}(g_i) = \min\{S(g_i), P_{max}(g_i) - P(g_i)\}$;

where $P_{max}(g_i)$ is maximum padding delay of the gate $g_i$, and a refined padding value $P_{ref}(g_i)$ of the gate $g_i$ is expressed as:

$P_{ref}(i) = P(i) + \min\{P_{add}(i), \min_j\{P_{rev}(j)|H(i, j) < P(i)\}\}$ $P_{ref}(g_i) = P(g_i) + \min\{P_{add}(g_i), \min_j\{P_{rev}(g_j)|H(g_i, g_j) < P(g_i)\}\}$.

7. The method as claimed in claim 6, wherein the padding value refinement step further comprises a wire padding value step to calculate a wire padding value for a wire $e(g_i, g_j)$, so as to further reduce the padding values of each gate/wire in the placed and routed design, where the wire padding value $P(g_i, g_j)$ is expressed as:

$P(i, j) = \min\{S(i, j), |\min\{0, H(i, j)\}|\}$ $P(g_i, g_j) = \min\{S(g_i, g_j), |\min\{0, H(g_i, g_j)\}|\}$.

8. The method as claimed in claim 7, wherein the spare cell selection step extracts conflicted padding gates/wires and their multiple subset sum solutions in case of one or more conflicts, sorts the conflicted padding gates/wires in an ascending order of the number of their recorded subset sum solutions, and accordingly assigns each padding gate to a best and available subset sum solution.

9. The method as claimed in claim 8, wherein the dummy metal allocation step uses a maximum flow network process to assign a virtual metal in case of one or more conflicts.

* * * * *